United States Patent Office.

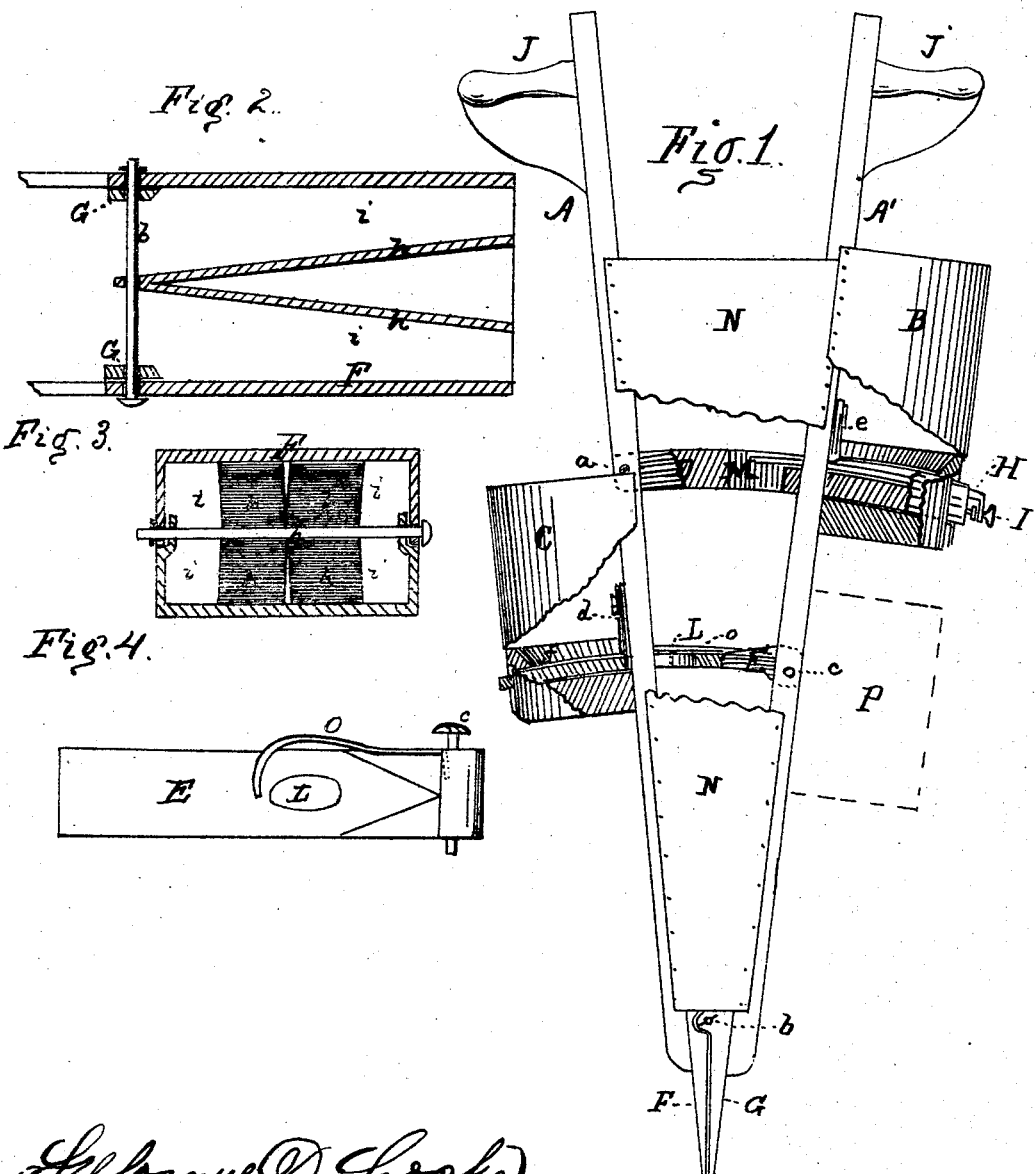

MATTHEW S. BURDICK, OF MILTON, WISCONSIN, ASSIGNOR TO HIMSELF AND JOHN M. MAY.

Letters Patent No. 71,972, dated December 10, 1867.

---

IMPROVEMENT IN SEED-PLANTERS.

---

The Schedule referred to in these Letters Patent and making part of the same.

---

Be it known that I, MATTHEW S. BURDICK, of Milton, in the county of Rock, in the State of Wisconsin, have invented a new and improved Seed-Planter for planting corn, pumpkins, and other seeds; and I do hereby declare that the following is a full and exact description thereof, reference being had to the accompanying drawings and to the letters of reference marked thereon, the same letter of reference representing the same part in each drawing.

The nature of my invention consists in regulating the quantity of corn or other seed to be planted in the cup, by means of a screw on the outside of the machine; in so constructing a seed-cup for pumpkin-seeds that flat seeds may be taken from a hopper and dropped with accuracy; in combining a pumpkin or squash-seed cup and hopper and a corn-seed cup and hopper, so that both may be used together at the same time, or only one, at pleasure; and in dividing the seed in the jaws or points that penetrate the ground, so that the seeds may be scattered in the hill to give ample room for their free growth.

Figure 1 is an elevation of my machine, with parts broken away to show the interior of the hoppers and seed-cups.

Figure 2 is the interior of one jaw or point of the pair, with the inclined partitions to separate the seed.

Figure 3 is a top view, the jaws cut through at the bolt that acts as a pivot to form a hinge, and Figure 4 is a view of a cup for flat seeds, as pumpkin and squash-seeds, and a spring-device to keep the seeds from packing, and to insure the filling the cup.

A and A' are the legs or principal bars of the machine, to which are attached hoppers B and C, which are broken away to show their interior; the side covering N of cloth or other elastic material; and at their lower end are attached the jaws or points F and G, having their hinge at $b$, while at their upper end are the handles J and J. The seed-cup bar D is hinged to A at $a$, and has the seed-cup M, which is enlarged or diminished by moving the bar H by means of the thumb-screw I. The ends of this bar being formed as shown, one end to allow of its being operated by the screw, and the other to enlarge or close the cup M. The screw $e$ holds a brush, as is usually employed. The seed-cup bar E for flat seed, as pumpkin or squash-seeds, is hinged to A' at $c$, while L is the cup, a little deeper than the thickness of the seed to be planted. This cup may be bushed for small or large seeds, as pumpkin-seeds or melon-seeds, or, separate seed-cup bars may be used by removing the pivot $c$, and placing another bar in the machine. $d$ is the screw that holds the brush in the usual manner. The curved spring O, attached to the seed-cup bar E, is caused to vibrate as the bar E and spring O are drawn through the mortise in leg A in operating the machine, and serves to move the seed directly over and into the cup, and, moreover, prevents the seed from packing in the hopper, to which it is liable, unless kept in motion as the machine is operated, although without the spring O, or its mechanical equivalent, the machine will operate well if the seed is dry and free from foreign substances. A plate or bar placed over and a little above the cup L, will serve substantially the same purpose as spring O. The space in the jaws F and G is divided by two half diaphragms or partitions $h$ and $h$, in each extending their length, as shown in figs. 2 and 3, leaving the spaces $i$ and $i$ tapering from their hinge to the point, and thus the seed is deposited in two parcels, at points distant from the centre, giving the plant more room to grow than when the seed is deposited in one place, as in the usual manner when machines are used. I do not confine myself to locating the pumpkin-seed hopper C on the opposite side of the planter from hopper B, as shown in fig. 1, but it may be placed underneath the corn-hopper B, as indicated by dotted lines at P, in fig. 1, in which case the seed-cup bar L is jointed to leg A of the machine, or elsewhere located on the machine, as may be found most convenient.

One important object in my machine is to drop corn and pumpkin-seed or other flat seeds at the same time and with the same movement of the machine; and when pumpkin-seeds are not required to be planted in every row, as, every other, the third or fourth row, remove pin $c$, and the seed-cup bar E ceases to operate. By replacing the pin, the planting from hopper C continues, or, a slide over the cup, to stop planting may be used. Another important object is obtained by the diaphragm or partition $h$ and $h$, by which the seed for a hill is divided and planted apart, giving more room for growth.

The filling the cups and dropping the seed into the jaws or points, is done by moving apart and carrying together the tops of the bars A and A' in the usual manner.

I am aware that legs with handles and a hopper similar to mine have been made, and do not claim them when only one hopper is used; also that a curved seed-bar has been used, and I do not claim that device; but, What I do claim as my invention, and desire to secure by Letters Patent, is—

1. Thumb-screw I, in combination with part H and seed-cup bar D, when constructed, connected together, and used substantially as and for the purposes described.

2. Seed-cup bar E or its equivalent, when combined with seed-cup bar D, in the same planting-machine, so that corn and pumpkin-seed and other flat seeds, as squash and melon-seeds, may be planted at one operation, substantially as described.

3. Spring O or its equivalent, attached to and combined with seed-cup bar E, substantially as and for the purposes described.

4. Jaws or points F and G, provided with partitions $h$ and $h$, for the purpose of dividing the seed, when used in combination with parts A and A', B and D, and N, substantially as described.

5. A general arrangement and combination of legs or bars A and A', hoppers B and C, seed-cup bars D and E, covering N, and jaws F and G, when constructed, connected together, and used substantially as and for the purposes described.

MATTHEW S. BURDICK.

Witnesses:
CHARLES J. BALCH,
ABRAM C. STANNARD.